United States Patent [19]

Singh

[11] Patent Number: 5,085,521
[45] Date of Patent: Feb. 4, 1992

[54] SQUEEZE FILM DAMPER SEAL

[75] Inventor: Anant P. Singh, Cincinnati, Ohio

[73] Assignee: General Electric Company, Cincinnati, Ohio

[21] Appl. No.: 640,785

[22] Filed: Jan. 14, 1991

[51] Int. Cl.⁵ ............................................. F16C 27/00
[52] U.S. Cl. ........................................ 384/99; 384/150
[58] Field of Search .................. 384/99, 535, 581, 124, 384/130, 152, 153, 477, 489, 150

[56] References Cited

U.S. PATENT DOCUMENTS

| | | | |
|---|---|---|---|
| 4,213,661 | 7/1980 | Marmol | 384/99 |
| 4,337,983 | 7/1982 | Hibner | 384/99 |
| 4,392,751 | 7/1983 | Ida et al. | 384/99 |
| 4,772,135 | 9/1988 | Griguscheit | 384/99 |
| 4,867,655 | 9/1989 | Barbic et al. | 384/99 X |

OTHER PUBLICATIONS

"Experimental Measurement of the Dynamic Force Response of a Squeeze Film Damper," Vance & Kirton, *Transactions of ther ASME*, Nov. 1975, p. 1283.

Primary Examiner—Thomas R. Hannon
Attorney, Agent, or Firm—Jerome C. Squillaro

[57] ABSTRACT

Shaft damper bearing utilizing spaced apart piston ring seals to seal off an annular squeeze film space between the rings, includes diagonal surface cross-section ring grooves in the bearing housing with diagonal cross-section rings in the housing grooves adapted to engage a bearing support undergoing radial motion in the housing.

6 Claims, 2 Drawing Sheets

SQUEEZE FILM DAMPER SEAL

BACKGROUND OF THE INVENTION

This invention relates to an improved squeeze film damper seal, and more particularly, to an improved piston ring seal and groove combination with adjustable piston ring sealing, for squeeze film dampers as associated with high speed turbo machinery, for example, hot gas turbine engines such as aircraft gas turbine engines.

In a prior typical squeeze film shaft damper arrangement, a shaft with its associated rolling element bearing are permitted to have some limited radial motion in the supporting bearing housing. Ordinarily an annular outer race of a supporting rolling element bearing of a shaft closely fits in an annular chamber in the support housing where two opposing closely adjacent circumferential surfaces of the housing and race define a thin annular squeeze film space into which an oil under pressure is introduced for damping action on the race. The race is fitted with spaced apart concentric piston ring type seals which circumferentially engage the bearing housing to seal off the squeeze film space between the rings. One problem with dampers as described, is sealing of the fluid film squeeze film space by means of the described piston ring seals under the known variable operating conditions of the damper. For example, the noted variable operating conditions include fluid pressure fluctuations adjacent the rings which lead to sealing instability of the rings and excess damper fluid leaking with compromised damper effectiveness. Furthermore, sealing ring and damper effectiveness may not be constant for different levels of turbine operation.

OBJECTS OF THE INVENTION

It is an object of this invention to provide improved piston ring sealing stability in a piston ring sealed squeeze film damper.

It is another object of this invention to provide an improved piston ring and groove combination and structure in a piston ring sealed squeeze film damper.

It is a further object of this invention to provide an improved adjustable sealing piston ring and groove arrangement for piston ring sealed squeeze film dampers.

SUMMARY OF THE INVENTION

An improved piston ring and groove arrangement for squeeze film dampers comprises a diagonal cross-section piston ring groove in a squeeze film damper housing with a diagonal cross-section and composite material piston ring in the housing groove and adapted to engage a bearing annular race to seal a squeeze film space between the race and the housing. Mechanical adjustment means adjust ring to race sealing.

This invention will be better understood when taken in connection with the following description and drawings.

DESCRIPTION OF PREFERRED EMBODIMENTS

Figure 1:
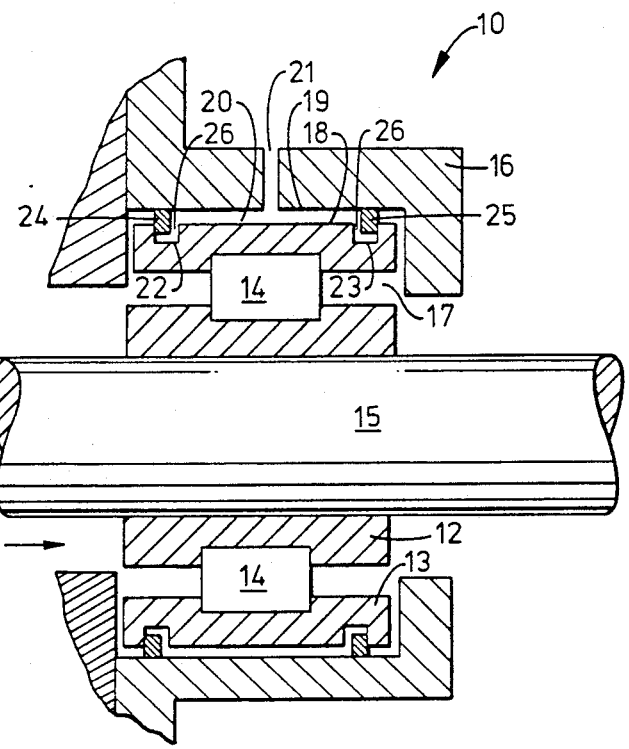
FIG. 1 is a partial schematic and cross-sectional illustration of a piston ring sealed squeeze film damper.

Referring now to FIG. 1, a squeeze film damper assembly 10 is combined with a rolling element bearing assembly 11 such as associated with high speed turbo machinery, for example, hot gas turbine engines and aircraft gas turbine engines. Bearing assembly 11 comprises an annular inner race 12 and a spaced outer annular race 13 with rolling elements 14 therebetween. Inner race 12 is fitted on a rotor shaft 15 so that inner race 12 rotates, with shaft 15, on rolling elements 14. A supporting housing 16 for bearing assembly 11 includes an annular chamber 17 therein, and outer race 13 is fitted or positioned in chamber 17 for limited radial motion therein. The outer circumferential and planar surface 18 of race 13 is closely adjacent an opposite circumferential and planar surface 19 of housing 16 to define a thin annular squeeze film space 20 therebetween. A damper fluid such as an oil under pressure, is introduced into squeeze film space 20 through an appropriate conduit or inlet 21 in housing 16.

Upon rotation of shaft 15, as a turbine rotor shaft, for example, any shaft rotor imbalance may cause shaft 15 and, bearing assembly 11 therewith, to undergo radial motion and subject oil in damper space 20 to very high pressure to force viscous flow of the oil and a damping action on bearing assembly 11. In order to seal damper oil in squeeze film space 20, race 13 includes a pair of spaced apart concentric grooves 22 and 23 in its outer surface 18 with squeeze film spaced 20 therebetween. A pair of metal gap piston rings 24 and 25 are fitted in grooves 22 and 23 respectively and adapted to peripherally engage circumferential wall 19 of chamber 17 to seal off squeeze film space 20.

In the arrangement as described, oil under pressure from squeeze film space 20 is utilized to assist ring and groove sealing. For example, each ring and groove combination is of a predetermined size to provide an open narrow circumferential side vent space 26 as a part of each groove and circumferentially adjacent squeeze film space 20. Accordingly, each vent space 26, exaggerated for the purpose of clarity in FIG. 1, is in direct fluid flow relationship with squeeze film space 20, and, as a result, high pressure in squeeze film space 20 is transmitted to vent space 26 where it is exerted against the adjacent side of a ring in its groove to urge the ring into firmer sealing relationship with its opposite groove wall. However, favorable sealing effects of vent spaces 26 are somewhat offset by a noted disadvantage. A vent space 26, having a fluid thickness significantly greater than that of squeeze film space 20, comprises an unconstrained boundary for squeeze film space 20, an arrangement which causes a concurrent decrease in squeeze film pressure axially along squeeze film space 20 approaching its boundary with a resultant loss of damper effectiveness. The improved ring and groove arrangement and structure of this invention obviates the deleterious effect of a vent space 26 by the use of a particular ring and groove structure which does not require or utilize a vent space 26. Such an arrangement and structure is more clearly illustrated in FIG. 2 where parts similar in design and function to those of FIG. 1 bear the same numerals.

Figure 2:
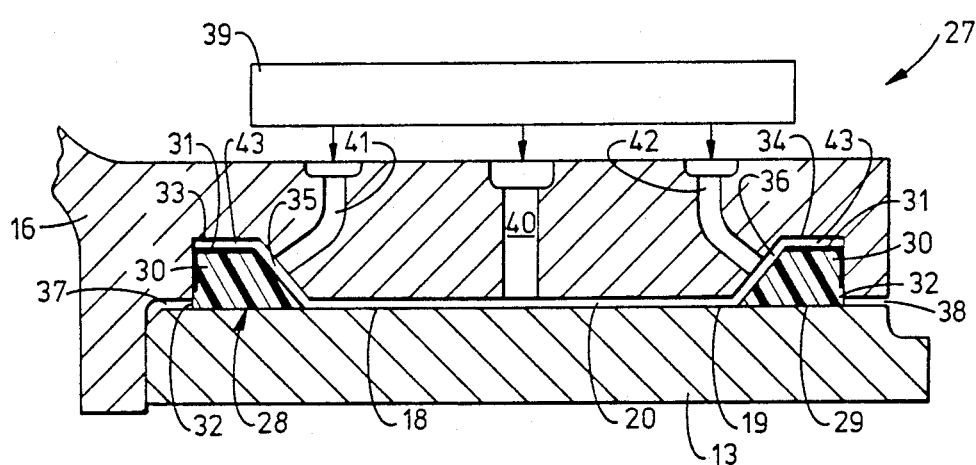
FIG. 2 is a partial schematic and cross-sectional illustration of a pertinent region of a piston ring sealed squeeze film space employing the improved piston ring and groove arrangement and structure of the present invention.

Referring now to FIG. 2, a squeeze film section 27 of a squeeze film damper includes a bearing race 13 cooperating with bearing housing 16 to define a squeeze film space 20 which is bounded or sealed by spaced apart piston rings 28 and 29 of a diagonal (trapezoidal) cross-section. More particularly, piston rings 28 and 29 are metal-non-metal composite rings for better sealing effectiveness. For example, each ring 28 and 29 includes an elastomer section 30 of a trapezoidal cross-section. Elastomer section 30 comprises three planar sides intersecting each other at right angles. Two of the three sides are an opposite larger inner side and an outer shorter side. The inner and outer sides are connected by a diagonal side in one direction and by the third or back side in the opposite direction. The trapezoid cross-section of elastomer section 30 is affixed to a right angle metal member 31 comprising a pair of planar sides in right angle relationship to each other. As illustrated, the planar sides of metal angle member 31 are superimposed on or overlap the outer and back sides of elastomer section 30. However, the back side of elastomer section 30 is longer than the superimposed side of metal angle member 31 so that a part of elastomer section 30 projects from metal angle member 31 as projection 32. It is only projection 32 which engages race 13 with full surface contact without any metal to metal contact between angle 31 and race 13 within the limitation of elastomer resiliency and the length of projection 32. In the present invention, piston ring grooves 33 and 34 are formed in bearing housing 16 so that the elastomer section 30 of rings 28 and 29 radially and peripherally engage the circumferential surface 18 of race 13 to seal squeeze film space 20 between rings 28 and 29. Moreover, each ring and its groove has a complementary diagonal cross-section where the diagonal surfaces of a ring and its groove are in spaced apart relationship to define diagonal fluid filled spaces or zones 35 and 36 having oil film thickness no greater than the thickness of the squeeze film space 20 to which the zones are directly exposed in fluid flow relationship. Other diagonal cross-sections may be utilized in the ring-groove combination of this invention including triangular and suitably modified polygonal and truncated geometrical figures, all of which may provide a large slant or diagonal surface spaced from a corresponding groove surface to define high pressure oil filled diagonal zones 35 and 36. As illustrated in FIG. 2, the spaced apart pair of diagonal cross-section rings 28 and 29 are positioned in what may be described as inverted truncated grooves to conform to the ring cross-sections in interfitting relationship, and so that the larger inner side or base of the trapezoid elastomer section 30 projects from the groove to peripherally engage surface 18 of race 13. Grooves 33 and 34 project radially into circumferential wall 19 of housing 16 and the opposite ring diagonals, of the pair of rings 28 and 29, and wall diagonals, of the opposite grooves 33 and 34, are directed towards or face each other across squeeze film space 20, i.e. the ring cross-sections as shown in FIG. 2, are reversed one with respect to the other. Also, as illustrated in FIG. 2, squeeze film space 20 is bordered or bounded by rings 28 and 29 but the opposing housing and race structures 16 and 13, respectively, axially extend to define further film spaces referred to as bumper portions of the damper.

Bumper portions 37 and 38 receive a supply of oil from leakage past rings 28 and 29 and function as open end squeeze film damper segments. Oil leakage past rings 28 and 29 and from bumper portions 34 and 35 is subsequently collected for treatment, such as cooling, and recirculated into squeeze film space 20.

As illustrated, the vertical vent spaces or dams 26 of FIG. 1 are absent in FIG. 2, having been replaced with diagonal zones 35 and 36 which do not represent unconstrained boundaries for squeeze film space 20, and therefore assist in maintaining a more constant and higher pressure axially along squeeze film space 20. During operation of a damper of this invention, oil in diagonal zones 35 and 36 is uncavitated, and accordingly hydrodynamic oil pressure in these zones bears on the diagonal surfaces of rings 28 and 29 to press the rings both laterally and vertically for more effective sealing of the rings laterally with their groove wall, and peripherally with race 13. Replacement of vertical spaces 26 with diagonal zones 35 and 36 represents what may be described as an additional width effectiveness of squeeze film space 20 without an actual increase in physical dimensions.

The improved piston ring seal of this invention may be provided with an interrelated oil supply or delivery system which cooperates with diagonal zones 35 and 36 of FIG. 2 not only for an improved oil supply but also for use of the delivery oil for additional sealing of the piston ring seals. Such an improved oil supply system is also illustrated in FIG. 2.

Referring again to FIG. 2 an oil supply system represented schematically as 39 includes a supply of damper oil under pressure and appropriate conduits leading to housing oil passages 40, 41 and 42, together with appropriate fluid flow controls to separately or selectively open and close those conduits to the passage of damper oil therethrough. Oil passage 40 leads directly to a central part of squeeze film space 20 while passages 41 and 42 lead directly to diagonal fluid zones 35 and 36 intermediate their ends where inlet oil is immediately brought to bear against the diagonal surfaces of the rings to press the rings laterally against a groove wall and radially against race 13. The trapezoidal cross-section of rings 28 and 29 together with a correlation of respective groove, ring, and race diameters, advantageously provides further fluid filled ring spaces 43 between what may be described as the inner surface of a groove and the outer circumference of its fitted ring. Spaces 43 are in fluid flow communication with squeeze film space 20 through intermediate diagonal zones 35 and 36, and therefore transmit squeeze film pressure to rings 28 and 29 for better radial sealing engagement with race 13.

In the oil supply system of this invention, inlet oil and inlet oil pressures are utilized to effectuate sealing of the damper during entry of the oil for efficient oil conservation. Three axially spaced oil inlet passages represent an advantageous oil delivery system for a squeeze film damper providing a measure of control over cavitation and oil pressure maintenance in the damper as well as reducing oil leakage. Preferably oil inlet passages 40, 41 and 42 each represent a plurality of such passages spaced circumferentially about race 13 and rings 28 and 29. Rings 28 and 29 are of the gap ring kind, i.e. in a circular or annular configuration with a gap space in the circle to define abutting spaced apart ring ends or a gap. Such a gap provides compression and expansion of the rings during damper operation under varying conditions with continuous sealing while at the same time accommodating design tolerances in the damper structure. Metal angle 31 supplies structural rigidity to a ring while at the same time permitting more of the volume of the elastomer to engage in the resiliency of the structure. Resiliency of the ring structure of FIG. 2, together with the gap supporting spring compression and expansion characteristics of angle 31, advantageously support a mechanical tuning or adjustment structure to provide for a variation in sealing forces. Such an adjustment structure 43 is illustrated in FIG. 3.

Figure 3:
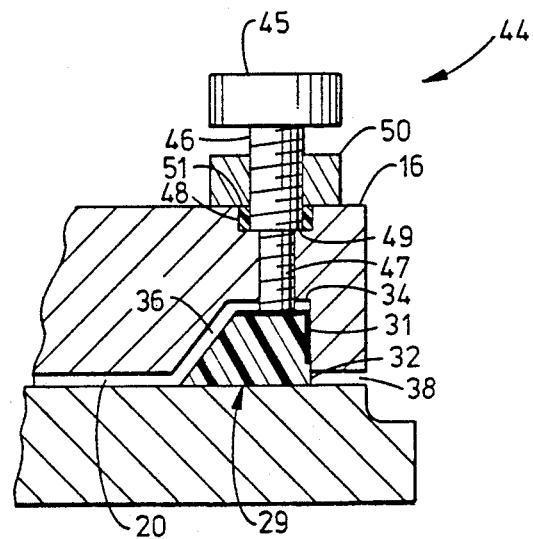
FIG. 3 is a partial and schematic illustration of a tuning mechanism for the improved piston ring and groove structure and arrangement of this invention.

Referring now to FIG. 3, one composite diagonal ring such as ring 29 of the pair of rings 28 and 29 of FIG. 2 is illustrated in its operative position in a squeeze film damper with its diagonal zone 36 next adjacent squeeze film space 20. An adjustment mechanism 44 is provided for each ring, a description of one sufficing for the other. Mechanism 44 comprises a screw 45 which passes through housing 16 to project into piston ring trapezoidal groove 34 to bear against what may be described as the top side of angle member 31. Screw 45 includes a threaded shoulder section 46 and a threaded shank section 47 which is threaded into an appropriately threaded into an appropriately threaded aperture in housing 16. Housing 16 also includes a counterbore recess 48 at the entrance to the threaded aperture for screw 43. Shoulder section 46 of screw 45 joins shank section 47 at a rim or shoulder 49 which may bear against the bottom surface of counterbore 47 to limit progress of screw 45 into housing 16 while at the same time limiting compression of ring 29 as well as decrease of the ring gap space. Shoulder section 46 is also threaded to receive a lock nut 50 thereon. Rotation of screw 45 causes progression of screw 45 into housing 16 for the end of section 47 to engage angle member 31 of ring 29 to bias ring 29 into firmer engagement with race 13 or, reversibly, to release compressive force from ring 29. When the desired engagement is achieved, lock nut 50 may be rotated to bear against housing 16 and frictionally bind screw 45 in the desired position. Screw 45 is sealed against oil leakage by means of a suitable washer or packing 51 in counterbore 48. The defined ring gap provides a limit to the compressibility of the ring structure and is appropriately correlated to the ring groove diameter as well as to the race 13 diameter for proper sealing within the gap dimension.

Adjustment mechanism 43, as described, is utilized to adjust the ring gap to fit the noted ring groove and race 13 diameters. In this connection there are two extreme positions for adjustment as illustrated in FIGS. 4 and 5.

Figure 4:
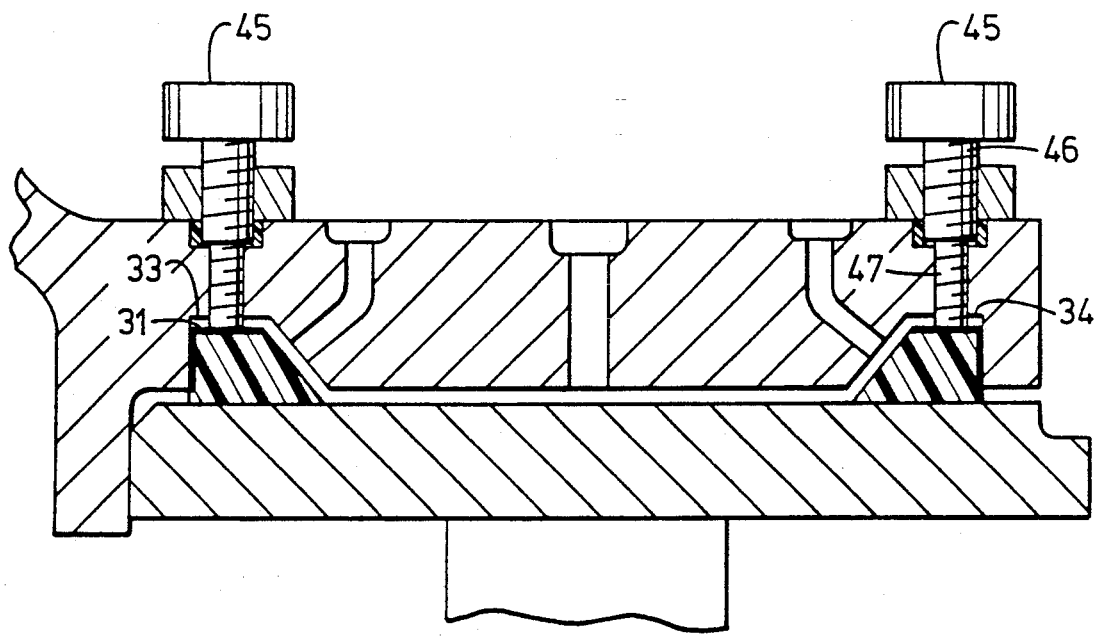
FIG. 4 is a partial illustration of a maximum sealing position of the tuning mechanism of FIG. 3 as applied to the ring-groove seal combination of this invention.

Referring now to FIG. 4, adjustment screws 45 have been rotated for maximum penetration into housing 16 and ring grooves 33 and 34. This position represents a minimum value for the ring gap and ring internal diameter for race 13, and maximum oil sealing. Also, maximum sealing includes oil supply 39 (FIG. 2) being energized to open oil passage 41 and 42 and close passage 40. Opposite conditions are shown in FIG. 5.

Figure 5:
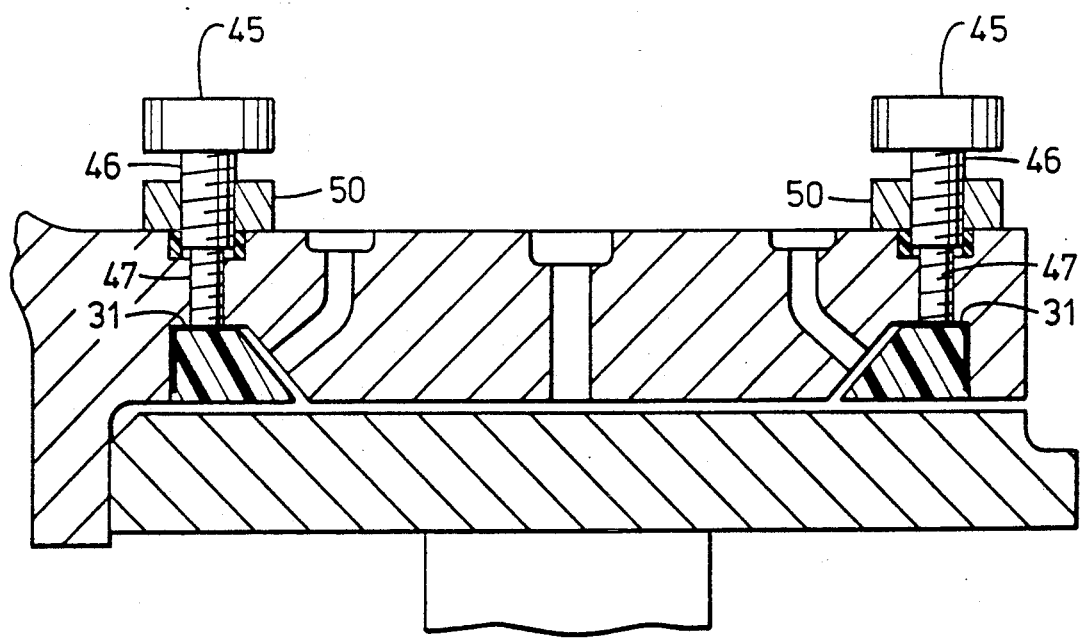
FIG. 5 is a partial and schematic illustration of the opposite extreme position of the tuning mechanism of FIG. 3 as applied to the ring/groove seal of this invention.

Referring now to FIG. 5, adjustment screws 45 are withdrawn a maximum so that their end sections 46 permit some ring expansion away from race 13 for controlled fluid leakage. In this position diagonal oil supply through passage 39 and 40 is closed off and ring gap and ring diameter are at their maximum value for the diameter of race 13. Ordinarily, an adjustment means 44 is employed for each ring. For more incremental tuning or adjustment, a plurality of adjusting means 44 may be employed circumferentially about the rings with oil supply passages such as 41 and 42 located between pairs of adjustment means 44. The oil supply system of this invention with selective and controlled oil delivery of multiple circumferential passages at spaced plural axial locations, together with plural circumferential adjustment means, provides an extensive and wide range of adjustment of dynamic coefficients of the damper. This result is accomplished with composite metal-non-metal gap rings with a screw mechanism sealing adjustment means.

The composite ring structure of this invention provides both a spring effect and radial flexibility. The spring effect of metal member 31 in a gap ring with a screw 45 pressing on the ring is advantageous in providing a certainty of a maximum gap for an installed ring I.D. Radial flexibility of the elastomer is necessary for proper circumferential sealing when the elastomer is being compressed. Additionally the use of a metal angle member 31 transmits the force of a usually small area screw end to a much larger angle area for more uniform compression of the elastomer material section 30.

This invention provides improved fluid pressure activated piston ring seals in a squeeze film damper where diagonal cross-section rings have composite metal-non-metal parts and are fitted in corresponding diagonal cross-section grooves in a fixed bearing housing to seal against a moving bearing member. In one embodiment, the rings have a trapezoid diagonal cross-section in which the non-metal part provides a sealing surface against moving bearing member, and where mechanical tuning means are utilized to adjust sealing engagement of the non-metal part.

While this invention has been disclosed and described with respect to a preferred embodiment thereof, it will be apparent to those skilled in the art that various changes and modifications may be made without departing from the spirit and scope of the invention in the following claims.

What is claimed is:

1. In a squeeze film shaft damper in which a rolling element supported shaft has an annular bearing support fitted in an annular chamber in the bearing housing for limited radial motion therein, and where the annular bearing support and an opposed circumferential wall of said annular chamber of said housing define a thin annular oil filled squeeze film space therebetween, the improvement comprising
   (a) a pair of spaced apart concentric grooves in said circumferential wall of said housing with said squeeze film space therebetween,
   (b) said grooves having a diagonal cross-section,
   (c) a pair of piston ring seals in said grooves,
   (d) said piston ring seals having a complementary diagonal cross-section to fit in said grooves in interfitting relationship to define a diagonal zone between the groove diagonal and its ring diagonal, with the diagonal of said diagonal cross-section of each ring facing in a direction towards each other,
   (e) oil supply means connected to supply oil under pressure directly to the said diagonal zones between the groove diagonal and ring diagonal and
   (f) mechanical adjustment means in said housing to provide a compressive force on said rings to urge said rings into sealing engagement with said bearing support.

2. The invention as recited in claim 1 wherein said oil supply is connected to said diagonal zones intermediate their ends.

3. The invention as recited in claim 1 wherein said oil supply is connected to said diagonal zones at a plurality of circumferentially spaced locations.

4. The invention as recited in claim 1 wherein said diagonal cross-sections are trapezoidal cross-sections.

5. The invention as recited in claim 1 wherein said diagonal zones are in open fluid flow relationship with said squeeze film space.

6. The invention as recited in claim 1 wherein said mechanical adjusting means comprises a screw threaded into said housing to project into a ring groove and bear against the ring in said groove.

* * * * *